3,369,053
HYDROLYSIS OF FRIEDEL-CRAFTS CATALYST-COMPLEXES
Francis J. Scarcello, West Falls, and Francis E. Evans, Hamburg, N.Y., assignors to Allied Chemical Corporation, New York, N.Y., a corporation of New York
No Drawing. Filed Dec. 16, 1965, Ser. No. 514,402
14 Claims. (Cl. 260—671)

This invention relates to improvements in the hydrolysis of Friedel-Crafts-hydrocarbon complexes, such as those obtained in the alkylation of hydrocarbons wherein metal salts, such as aluminum chloride, function as catalysts.

The preparation of alkylaryl hydrocarbons by the reaction of alkyl halides with aromatic hydrocarbons in the presence of a Friedel-Crafts type catalyst is well known. This reaction has been used on a large commercial scale as a step in the production of alkylaryl sulfonates which are utilized as components in a wide variety of surface active compositions.

The method of preparing alkylaryl compounds, for example dodecylbenzene, involves the condensation of a mixture comprising essentially long chain alkyl chlorides and the parent aliphatic hydrocarbons with benzene, usually in excess of the stoichiometrically required amount to react with the alkyl chloride added in the presence of a Friedel-Crafts catalyst, such as aluminum chloride. The mass following reaction is drawn off from the solid, essentially unused catalyst. This liquid alkylate fraction on standing deposits a dark viscous oil which is the metal halide tar consisting essentially of the metal halide hydrocarbon complex. The exact nature of this tarry complex is not known and further it is generally accepted that its composition varies with both the compounds partaking in the reaction and the conditions leading to its formation.

It is known, however, that this complex may be decomposed by heat or by aqueous reagents, including water. In the latter case, emulsions are formed which break slowly and with some difficulty. Moreover, significant amounts of the emulsion generally do not decompose into the components during the time allotted for the breaking of the emulsion. Such emulsion material is usually separated and discarded and hence represents loss of significant amounts of valuable materials, especially in commercial operations.

Accordingly, the primary object of our invention is to provide an improved process for the hydrolysis of Friedel-Crafts catalyst complexes obtained in hydrocarbon alkylation reactions wherein a metal halide is used as a catalyst.

Another object is to provide a process wherein metal halide catalyst complexes, particularly aluminum chloride complexes are rapidly and substantially completely hydrolyzed.

These and other objects and advantages of our invention will be obvious from the following description.

In the discussion that follows, it will be understood that aluminum chloride is given merely as an example since other metal halides, particularly metal chlorides, are conventionally used as Friedel-Crafts catalysts forming complexes which are likewise hydrolyzed only with great difficulties. Typical examples of such catalysts include zinc chloride, aluminum bromide, ferric chloride, antimony pentachloride, and the like and mixtures thereof.

We have made the surprising discovery that almost instantaneous and substantially complete hydrolysis of the metal halide-hydrocarbon complex obtained as a tarry by-product in alkylations of aryl hydrocarbons in the presence of a metal halide as catalyst and substantially complete and instantaneous separation of the resultant oil and aqueous phases are obtained by carrying out the hydrolysis in the presence of a non-ionic surfactant.

Thus, in accordance with the present invention, the metal halide tar, which is obtained, for example, in the reaction of a mixture comprising essentially normal tetradecane monochloride and n-tetradecane with benzene in excess and in the presence of aluminum chloride as catalyst (for example, as disclosed in Example 1 of U.S. application Ser. No. 415,497 filed Dec. 2, 1964) is run into a hot aqueous solution of a non-ionic surfactant which is present in an amount of at least about 0.1% by weight of the aluminum chloride-hydrocarbon complex being decomposed. Preferably, the aqueous solution in which the decomposition is effected is maintained hot, i.e., above about 60° C. A stream of water about equal in amount by weight, to the tarry complex, may be added simultaneously to the decomposing mass as a matter of convenience and efficiency, especially when the process is carried out continuously. The aluminum chloride-hydrocarbon complex is decomposed rapidly (as the benzene component, at least in part, distills with steam from the mass) and the residual hydrocarbon(s) separates from the aluminum chloride solution substantially instantaneously. The mixture may be drawn off continuously to a conventional means for separating such mixtures or the layers drawn off separately in a batch wise fashion. The aqueous layer, containing most if not all of the non-ionic surfactant can be recycled to the decomposition vessel, in a continuous fashion, or be treated in a known manner for recovery or utilization of the aluminum chloride values contained therein.

The surfactant used in this improved process can be selected from the broad class of commercially available nonionic surfactants. Preferably a nonionic surfactant is used which is soluble in water at least to the extent used in this process.

Inasmuch as most surfactants available commercially at this time are technical products and mixtures which may vary in efficacy and strength, the amounts stated herein relate to and are based on the so-called "active ingredient" present in the technical product.

Representative nonionic surfactants which can be used in the process of this invention include the following:

| Commercial Name: | Active Ingredient [1] |
|---|---|
| Triton X-100 | Isooctyl phenyl polyethoxy ethanol containing 9-10 oxyethylene groups. |
| Triton X-120 | Alkylaryl polyether alcohol containing 9-10 oxyethylene groups. |
| Triton X-123 | Alkylbenzyl polyethylene glycol ether. |
| Tween 20 | Polyoxyethylene sorbitan monolaurate. |
| Tween 40 | Polyoxyethylene sorbitan monopalmitate. |
| Tween 60 | Polyoxyethylene sorbitan monostearate. |
| Tween 80 | Polyoxyethylene sorbitan monoleate. |
| Tween 85 | Polyoxyethylene sorbitan trioleate. |
| Dowfax 9N4 | Nonylphenol, 4 mole ethylene oxide adduct. |
| Dowfax 9N10 | Nonylphenol, 10 mole ethylene oxide adduct. |
| Dowfax 9N15 | Nonylphenol, 15 mole ethylene oxide adduct. |
| Igepal CA 630 | Octylphenoxypoly(ethyleneoxy)ethanol. |
| Igepal CO 520 | Nonylphenoxypoly(ethyleneoxy)ethanol. |
| Igepal CTA 639 | Alkylphenoxypolyl(ethyleneoxy)ethanol. |
| Igepal LC-630 | Straight-chain-dodecylphenol ethylene oxide condensate. |
| Cerfak 1300 | Alkyl polyether alcohol. |
| Cerfak N-100 | Polyethanolamine condensate of fatty acid. |
| Ethofat C/25 | Ethylene oxide condensate of fatty acids. |
| Schercomid SCE | Diethanolamide of coconut fatty acids. |

[1] "Detergents and Emulsifiers" 1965 Annual, J. W. McCutcheon, Inc.

Mixtures of these and equivalent compositions can be used also.

The amount of nonionic surfactant required should be at least that amount which will substantially prevent the formation of an emulsion of the aqueous aluminum chloride and the hydrocarbon. In general, about 0.4% by weight of the nonionic reagent based on the weight of the tarry complex should be used. Amounts of 1% or more can be used but the increase in effectiveness, if any, does not justify the use of such relatively large quantities of surfactant.

In a preferred embodiment, we effect hydrolysis in the presence of a surfactant and additionally in the presence of an aqueous solution of the metal halide, such as aluminum chloride, usually as a 10 to 40% solution and preferably as a 20 to 30% solution. The presence of the aqueous solution of aluminum chloride provides an aqueous layer of higher gravity and thereby aids in the separation of the aqueous and organic layers. Moreover, the presence of additional aluminum salt aids in preventing the formation of stable emulsions. In general, we employ amounts of such aqueous solutions to provide about 50 to 150% by weight, preferably 70 to 100%, based on the weight of the tarry complex to be hydrolyzed. This aqueous solution may be conveniently provided by recycling part or all the aqueous aluminum chloride layer obtained after the decomposition of the tarry complex and separation from the organic portion of the decomposition mixture.

The surfactant may be introduced in any convenient fashion; it may be admixed with the tarry complex prior to contact of said complex with the aqueous stream; it may be dissolved in aqueous stream fed simultaneously with the stream of tarry complex to the decomposition mixture; or it may be added to the aqueous liquor present in the decomposition vessel at the start of the reaction. When operating in a continuous manner, it is convenient to introduce the surfactant with the aqueous stream and to provide this stream by recycling part or all of the aqueous aluminum chloride layer obtained from a previous decomposition and separation procedure.

The decomposition of the tarry complex material in accordance with the present invention is preferably carried out at elevated temperatures. Thus although this step of the improved procedure can be operated with acceptable results at ambient temperature, superior results are obtained when the tarry complex is decomposed by a hot aqueous solution, i.e., at about 60° C. and above. Since the reaction(s) occurring during the decomposition are exothermic in nature, maintaining the temperature at about 120° C. or above may introduce problems due to the boiling of the aqueous phase of the mixture. Especially good results are obtained when the decomposition is carried out between about 80° C. and about 120° C. The practical maximum temperature is determined by the boiling point of the aqueous aluminum chloride, since concentration thereof to the point of incipient crystallization is to be avoided.

The following examples will illustrate the improved process of our invention but it is to be distinctly understood that the invention is not in any way limited to the details set out in these examples. Parts and percentages are by weight and temperatures are given in degrees centigrade.

*Example I*

A mixture of 3.9 parts of Triton X-100 and 300 parts of 26.9° Bé aqueous aluminum chloride was heated to a temperature of from about 105° to 110°. As this hot solution was agitated, 480 parts of aluminum chloride-n-higher alkane complex tar, derived from the alkylation of benzene with n-alkyl chloride-n-alkane mixture in the presence of a Friedel-Crafts catalyst comprising aluminum chloride, and 480 parts of water were added, in separate streams and at approximately the same rate. The additions required about one hour. Benzene, contained in the tar, steam distilled from the mixture and the distillate was collected in a water separator. The aqueous portion of the distillate was returned to the hydrolysis reaction. The mixture was maintained at 108° to 110° for about 15 minutes after completion of the additions. A clean separation of the aqueous and organic phases of the mixture was obtained practically instantaneously.

There was recovered 158.7 parts of benzene, 894.5 parts of 26.5° Bé aqueous aluminum chloride and 175.4 parts of organic hydrocarbon containing material.

*Example II*

A series of experiments were run substantially as described in Example I above, but in which the surfactant and amount thereof was varied. The results obtained and observations made are set out in Table I below.

TABLE I

| Ex. No. | Surfactant Used | Percent Recoveries | | | | Observation |
|---|---|---|---|---|---|---|
| | | Benzene | AlCl₃[1] | Organic | Total[2] | |
| 2 | None | 30.1 | 31.2 | 51.6 | 112.9 | Poor separation. Considerable stable emulsion containing water and aluminum chloride in oil (i.e. "organic") layer. |
| 3 | 0.4% Triton X-100 | 29.8 | 35.0 | 38.3 | 103.1 | Complete instantaneous separation. |
| 4 | 0.25% sodium p-toluene-sulfonate | 32.5 | 31.5 | 50.0 | 114.0 | Poor separation. |
| 5 | 0.2% Tween 20 | 27.4 | 32.8 | 39.6 | 99.8 | Complete and instantaneous separation. |
| 6 | 0.32% Nacconol SL[3] | 32.0 | 27.8 | 59.4 | 119.0 | Three distinct layers observed. Poor separation. |
| 7 | 0.1% Tween 20 | 25.8 | 35.6 | 40.8 | 102.6 | Complete and instantaneous separation. |
| 8 | 0.16% Nacconol NR[4] | 29.2 | 33.2 | 45.0 | 107.4 | Poor separation. AlCl₃ soln. cloudy. |
| 9 | 0.4% Tween 20 | 29.0 | 35.0 | 39.1 | 103.1 | Complete and instantaneous separation. |
| 10 | 0.4% Dowfax 9N10 | 31.6 | 34.8 | 37.8 | 104.2 | Do. |
| 11 | 0.4% Igepal CA-630 | 32.0 | 34.2 | 37.7 | 103.9 | Do. |
| 12 | 0.4% Cerfak 1300 | 32.0 | 34.6 | 37.8 | 104.4 | Do. |

[1] Calculated as 100% AlCl₃ from Baumé of solution.
[2] Total recovery over 100% due to moisture in organics.
[3] Aqueous solution containing 40% sodium alkylaryl sulfonates.
[4] Solid composition containing 40% sodium alkylaryl sulfonates.

It can thus be seen that an efficient and economical improved process has been devised for the hydrolysis of the tarry aluminum chloride-hydrocarbon complex obtained from the alkylation of aromatic hydrocarbon in the presence of aluminum chloride and the recovery from such complexes of valuable materials.

Although the above purely illustrative examples include a description of the best manner of carrying out the improved process presently known to us, the examples and the details contained therein should not be interpreted in a limiting sense as will be obvious to those skilled in this art, many variations in the specific details can be made within the scope and spirit of our invention.

We claim:

1. In the process of hydrolyzing a Friedel-Crafts metal halide-hydrocarbon complex-containing tarry material obtained as a by-product from the alkylation of aromatic hydrocarbons with alkyl chlorides in the presence of a Friedel-Crafts catalyst, the improvement which comprises hydrolyzing said complex in the presence of a nonionic surfactant in an amount sufficient to prevent the formation of stable emulsions.

2. The process of claim 1 wherein said Friedel-Crafts catalyst is aluminum chloride.

3. The process of claim 1 wherein the nonionic surfactant is present in an amount of at least about 0.1% by weight of the tarry complex being hydrolyzed.

4. The process of claim 1 wherein said hydrolysis is effected at a temperature above about 60° C.

5. The process of claim 1 wherein said surfactant is an alkyl aryl polyethylene ether alcohol containing 9 to 10 oxyethylene groups.

6. The process of claim 1 wherein said hydrolysis is effected at a temperature of from about 80° C. to about 120° C.

7. The process of claim 1 conducted continuously.

8. The process of claim 1 wherein said surfactant is added as a mixture with an aqueous solution of a Friedel-Crafts metal halide.

9. The process of claim 8 wherein said metal halide aqueous solution is present in an amount of at least 50 percent by weight of the tarry complex.

10. In the process of hydrolyzing an aluminum chloride hydrocarbon complex-containing tarry material obtained as a by-product from the alkylation of aromatic hydrocarbons with an alkyl chloride in the presence of aluminum chloride, the improvement which comprises hydrolyzing said complex in the presence of a nonionic surfactant in an amount of at least 0.1% by weight of the tarry complex being hydrolyzed whereby the hydrolysis mixture separates instantaneously into aqueous and organic fractions.

11. The process of claim 10 wherein said surfactant is an alkyl aryl polyethylene ether alcohol containing 9–10 oxyethylene groups.

12. The process of claim 11 wherein said hydrolysis is effected at a temperature above about 60° C.

13. The process of claim 10 wherein said surfactant is added as a mixture with a 10 to 40% aqueous solution of aluminum chloride in an amount of at least 50 percent by weight of the tarry complex.

14. The process of claim 13 conducted continuously.

References Cited

UNITED STATES PATENTS

| | | | |
|---|---|---|---|
| 2,246,007 | 6/1941 | Robinson | 260—671 |
| 2,852,582 | 9/1958 | Stallings et al. | 260—683.53 |
| 2,905,537 | 9/1959 | Copenhauer | 208—13 XR |
| 3,231,514 | 1/1966 | Sechrist et al. | 252—414 |

DELBERT E. GANTZ, *Primary Examiner.*

C. R. DAVIS, *Assistant Examiner.*